United States Patent [19]

Walden

[11] Patent Number: 5,191,831
[45] Date of Patent: Mar. 9, 1993

[54] OVEN WITH WATER RING ASSEMBLY

[76] Inventor: Max W. Walden, 401 Porter St., Hanford, Calif. 93230

[21] Appl. No.: 753,963

[22] Filed: Sep. 3, 1991

[51] Int. Cl.⁵ ............................................. A47J 27/00
[52] U.S. Cl. ....................................... 99/446; 99/417; 99/447; 99/448; 99/481; 99/482; 126/369; 126/377
[58] Field of Search ................. 99/340, 403, 408, 410, 99/416, 417, 444, 446, 448, 447, 473, 481, 482; 126/369, 373, 376–378, 381; 219/401

[56] References Cited

U.S. PATENT DOCUMENTS

| | | | |
|---|---|---|---|
| 57,577 | 8/1866 | Saroni | 126/381 |
| 410,703 | 9/1889 | Avery | 126/369 |
| 665,952 | 1/1901 | Caldwell | 126/369 |
| 679,679 | 7/1901 | Kopisch | 126/369 |
| 1,109,828 | 9/1914 | Goff | 126/377 |
| 1,452,907 | 4/1923 | Campbell | 126/369 |
| 2,127,658 | 8/1938 | Walterspiel | 99/444 |
| 2,138,908 | 12/1938 | Douthitt | 126/369 |
| 3,375,775 | 4/1968 | Folmar | 99/446 |
| 3,555,995 | 1/1971 | Berger | 99/446 |
| 4,094,295 | 6/1978 | Boswell et al. | 126/25 R |
| 4,189,995 | 2/1980 | Löhr et al. | 99/417 |
| 4,495,860 | 1/1985 | Hitch et al. | 99/340 |
| 4,810,510 | 3/1989 | Lever et al. | 426/233 |
| 4,924,071 | 5/1990 | Jacobs | 219/400 |
| 4,982,656 | 1/1991 | Stone | 99/403 |

FOREIGN PATENT DOCUMENTS

| | | | |
|---|---|---|---|
| 75371 | 2/1919 | Austria | 99/446 |
| 863292 | 1/1953 | Fed. Rep. of Germany | 99/446 |
| 1093532 | 11/1960 | Fed. Rep. of Germany | 99/403 |
| 1182468 | 6/1959 | France | 99/403 |
| 371514 | 4/1932 | United Kingdom | 99/444 |

*Primary Examiner*—Harvey C. Hornsby
*Assistant Examiner*—Mark Spisich
*Attorney, Agent, or Firm*—Flehr, Hohbach, Test, Albritton & Herbert

[57] ABSTRACT

An oven assembly (20) includes a housing (38) having a cover (50), a bottom floor (42) and a side wall (28) which define an interior cooking volume (22). an annular water trough (24) is positioned in the housing (38) proximate its interior bottom. The trough (24) includes an outer trough perimeter (26) dimensioned to extend sufficiently close to the side wall (28) around the housing perimeter such that the trough (24) is positioned for receipt of gravitating substances deposited on the side wall (28), and is formed to receive and collect the substances. Moreover, the trough (24) is to retain a quantity of a liquid (43) sufficient for humidification of food cooked in the oven interior. Lastly, a drainage mechanism (36) is disposed at the bottom of the trough (24) for removing substances and liquids from the trough (24). The trough (24) includes an inner trough perimeter which defines an opening (58) in a middle section thereof such that the heating elements (32, 34) may provide heat to the interior volume (22). A deflector (64) is centrally positioned above the opening (58), wherein the heated air passing through the opening (58) is deflected by the deflector (64) over the trough (24) and over the liquid (43) to humidify the same. A method for cleaning the oven interior (22) by draining the substances and liquids from the trough (24) through the drainage mechanism (36) is also described.

24 Claims, 4 Drawing Sheets

OVEN WITH WATER RING ASSEMBLY

TECHNICAL FIELD

The present invention relates, in general, to cooking ovens, and more particularly, relates to smoker ovens which facilitate cleaning of the same.

BACKGROUND OF THE INVENTION

Smoker ovens are widely employed in domestic and, especially, commercial applications to slowly cook and process meats, poultry and fish (hereinafter "meats"). Typically, these meats are hung or suspended in a large oven wherein desirable wood chips of choice are heated to a smoldering temperature thereby providing heat to cook the meat and smoke to flavor the same. The exceptional flavoring of smoked meats can only be attained through this special process. Unfortunately, because of the nature of this slow process, the meats often become too dry, leathery and non-palatal. Moreover, the cooking byproducts ordinarily adhere to and are slowly baked onto the oven walls resulting in extensive labor to clean the oven.

As smoke cooking takes place, oil, grease and other cooking byproducts slowly drip from the meats which accumulate or puddle at the bottom surface of the oven, or are splattered onto the walls. To help alleviate some of these problems, removable drip pans or slidable trays are sometimes placed at the bottom to collect the aforementioned drippings.

Typical of prior art smoker ovens are the ovens disclosed in U.S. Pat. No. 3,375,775 to Folmar and U.S. Pat. No. 3,555,995 to Berger each of which describes an oven containing a slidable tray positioned near the bottom of the oven to collect drippings which may otherwise accumulate on the bottom.

Such an approach, nonetheless, becomes problematic when such drippings hit the sides of the tray which promote splattering and baking onto the walls. The cooking byproducts often become baked onto the oven surfaces which substantially increase adherence. Removing the wall splatter, therefore, requires highly pressured scrubbing or brushing of the interior walls. Other times, the drippings miss the tray completely and fall through to the oven floor. Moreover, the tray must be manually removed and cleaned to discard the drippings from the tray. Accordingly, cleaning is very difficult and often very laborious once the dripping solidifies.

In still other instances, as previously mentioned, because of the relatively low heats involved during this process, the cook time is substantially longer than that required in conventional cooking. Slow evaporation occurs which substantially dries and shrinks the cooked product. To combat the evaporatory effects of smoker ovens, water is often introduced into the dripping trays to humidify the cooking area, reduce cooking evaporation and reduce meat shrinkage. For example, U.S. Pat. No. 4,924,071 to Jacobs, U.S. Pat. No. 4,495,860 to Hitch et al. and U.S. Pat. No. 4,094,295 to Boswell et al. disclose cooking apparatus which provide trays filled with water proximate the bottom of the oven. However, in all the aforementioned references, the meat drippings may similarly splatter onto the oven walls after hitting the tray sides which again requires extensive labor for removal. Moreover, to clean or refill the trays, removal from the oven is necessary.

Accordingly, it is an object of the present invention to provide a smoker oven apparatus and method which will reduce the need for cleaning the oven.

It is a further object of the present invention to provide a smoker oven apparatus and method which substantially eliminates meat drippings from accumulating at the bottom surface of the oven.

It is another object of the present invention to provide a smoker oven apparatus and method which reduces meat drippings from splattering onto the smoker oven walls.

Yet another object of the present invention to provide a smoker oven apparatus and method which eases the task of cleaning the oven.

It is still another object of the present invention to provide a smoker oven apparatus and method which reduces product shrinkage.

Still it is a further object of the present invention to provide a smoker oven apparatus and method which facilitates water removal and refilling of the same inside a humidified smoker oven.

It is a further object of the present invention to provide a smoker oven apparatus which is durable, compact, simple to use, easy to maintain, and is economical to manufacture.

The device of the present invention has other objects and features of advantage which will become apparent from and are set forth in more detail in the description of the Best Mode of Carrying out the Invention and the accompanying drawing.

DISCLOSURE OF INVENTION

In summary, the oven of the present invention is particularly suitable for commercial or industrial applications. However, adaptation for domestic or household use is easily accommodated. The oven with water ring assembly of the present invention includes a housing having a top, a bottom and a side wall having an inner housing perimeter defining an interior volume between the top and the bottom, and a heating element positioned proximate the bottom of the housing. The improvement of the oven assembly comprises, briefly, an annular trough positioned in the housing proximate its interior bottom. The trough includes an outer trough perimeter dimensioned to extend sufficiently close to the side wall around the inner housing perimeter such that the trough is positioned for receipt of gravitating substances deposited on the side wall, and is formed to receive and collect the substances. Moreover, the trough is formed to retain a quantity of a liquid sufficient for humidification of food cooked in the oven interior. Lastly, a drain assembly extends from the trough to an outside of the housing for removing the substance and the liquid from the trough.

In another aspect of the present invention, the trough includes an inner trough perimeter which defines a recess in a middle section thereof such that the heating elements may provide heat to the interior volume. Additionally, deflector means is centrally positioned above the recess, wherein the heated air passing through the recess is deflected by the deflector over the trough and over the liquid to humidify the same. The upwardly facing surface of the deflector directs cooking by products and drippings outwardly and into the annular trough.

The method of cleaning the cooking interior of an oven of the present invention is comprised, briefly, of the steps of spraying cleaning fluid into the interior of the oven which substantially collects in the trough and then cleaning the interior of the oven. Subsequently, the cleaning fluid and other substances are then removed from the oven interior by a drainage mechanism situated at the bottom of the trough.

The oven with ring assembly constructed in accordance with the present invention will be understood with reference to the following detailed description, together with additional objects and attendant advantages, taken in conjunction with the accompanying drawing.

BEST MODE FOR CARRYING OUT THE INVENTION

Reference will now be made in detail to the preferred embodiments of the invention, examples of which are illustrated in the accompanying drawings. While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

Figure 1:
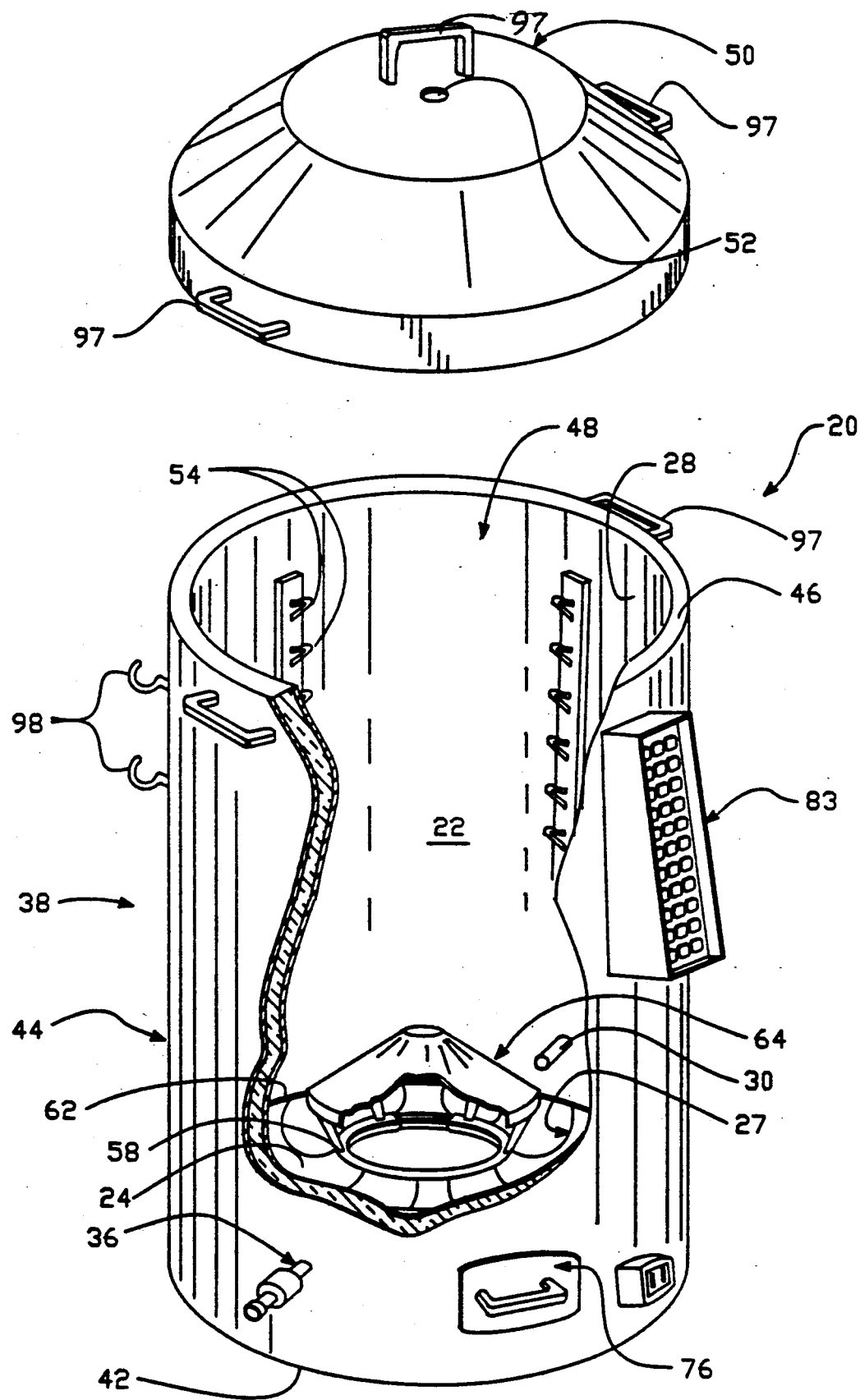
FIG. 1 is a top perspective view, partially broken away, of the smoker oven and cover designed in accordance with the present invention.

Turning now to the drawings, wherein like components are designated by like reference numerals throughout the various figures, attention is directed to FIG. 1 where there is provided a cutaway view of the smoker oven, generally designated 20, designed in accordance with the present invention. Briefly, smoker oven 20 provides an efficient means for facilitating cleaning of the smoker oven cooking interior volume after cooking has taken place. As will be described in greater detail below, an oven cooking interior volume 22 is provided in which an annular water trough 24 is situated near the lower portion of oven interior 22. The outermost trough perimeter 26 is dimensioned to extend sufficiently close to a side wall 28 of oven 20 as to contact or preferably be received in a recess 62 (FIG. 2) with side wall 28. Accordingly, trough 24 is positioned for receipt of gravitating substances deposited on side wall 28.

Figure 2:
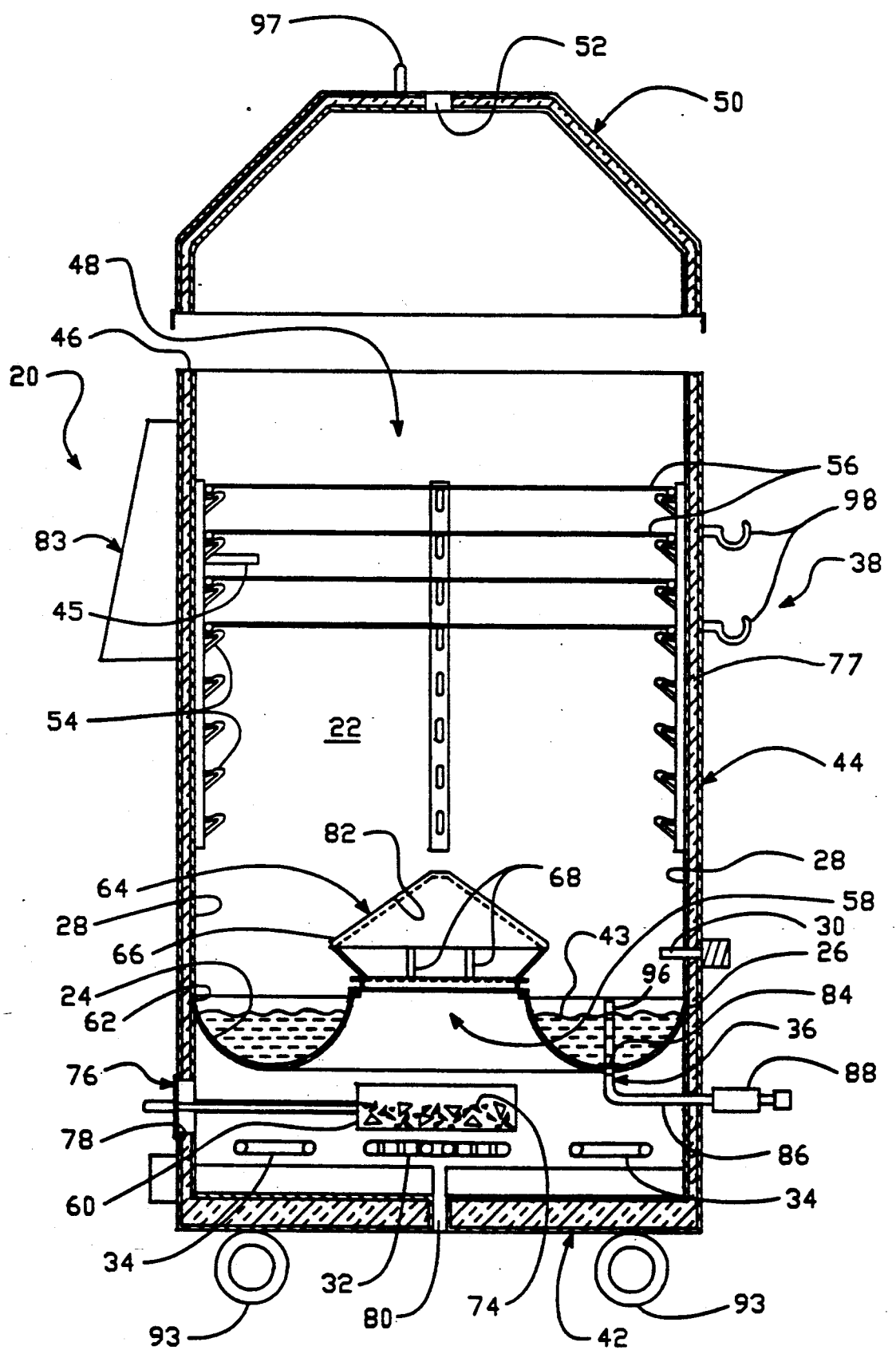
FIG. 2 is a front elevation view, in cross section, of the smoker oven of FIG. 1.
Figure 3:
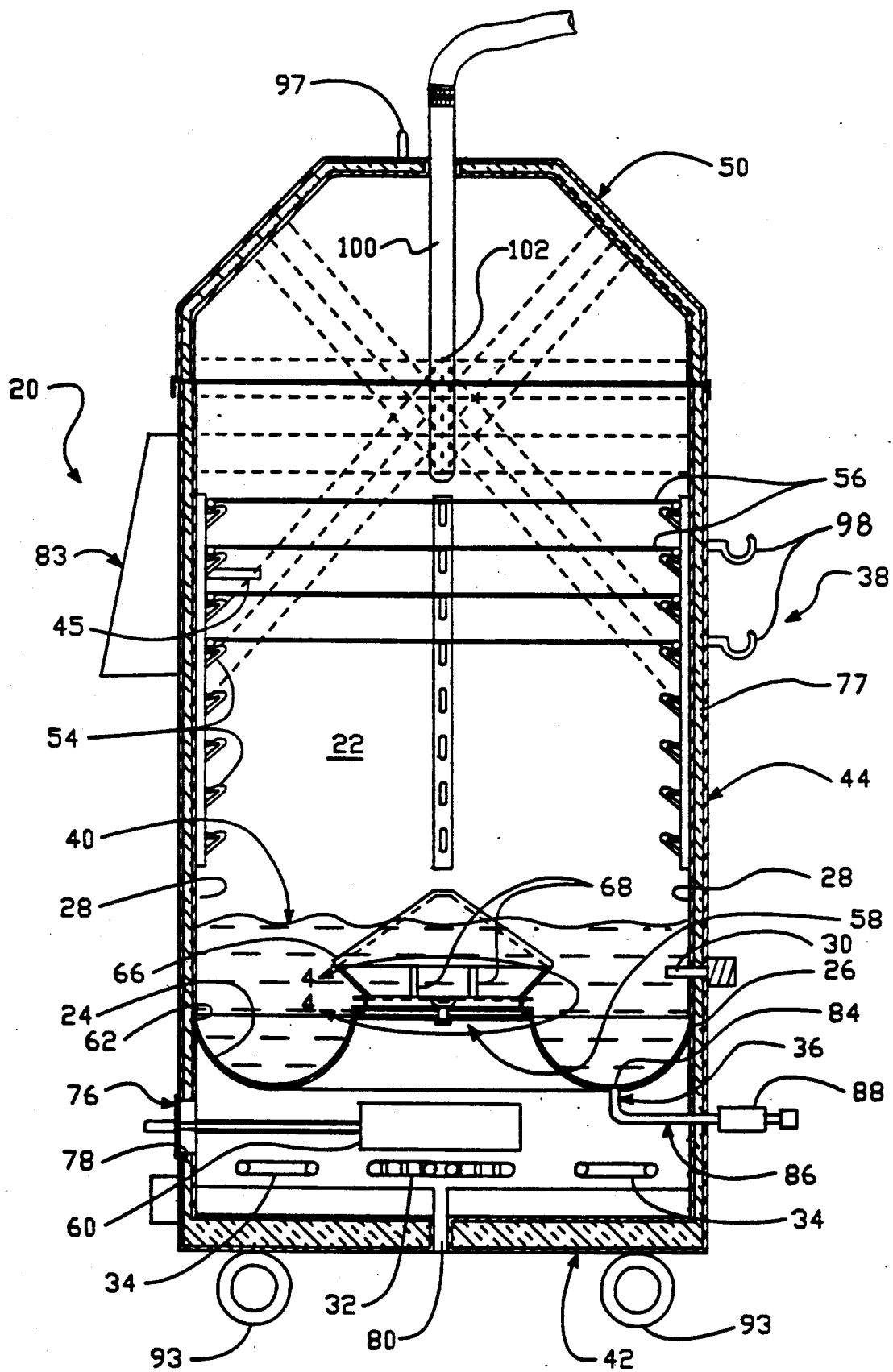
FIG. 3 is a front elevation view, in cross-section, of the smoker oven of the present invention shown filled with water during cleaning of the cooking interior.

Moreover, in accordance with the present invention, upon cleaning, the cooking interior 22, may be partially filled with a cleaning liquid 40 through an inlet 30 such that the liquid 40 level is preferably just above the trough 24, as shown in FIG. 3. In the preferred form, both the humidifying liquid 43 (FIG. 2) and the cleaning liquid 40 are water which are both provided through inlet means 30. It will be appreciated, however, that other liquids may be substituted.

In a wash basin fashion, detergent is added to cleansing water 40, and the mixture is heated through heating means 32 and 34 to aid in removal or loosening of the baked-on meat byproducts. Subsequently, the side walls 28 and trough 24 are lightly brushed, and the dislodged debris collects in the trough 24. Thus, cooking interior 22 acts as a large wash basin in which interior 22, and all complementary parts, may be washed.

A drainage means 36 is provided proximate the bottom of the trough 24 to enable cleansing water 40 to be drained from interior 22. Accordingly, the present invention eliminates the necessity of removal of the dripping trays upon cleaning and filling, and more importantly, substantially reduces the laborious task of scrubbing the oven walls to remove baked-on debris.

Referring back to FIG. 1, there is provided an insulative housing 38 comprising a bottom floor portion 42 and cylindrical body portion 44. Body portion 44 includes a substantially vertical interior side wall 28 having an inner housing perimeter, which defines cooking interior 22, and includes an upper body rim portion 46, which defines a top opening 48. Removably mounted atop opening 48 and dimensioned to snugly engage upper body rim 46 is an insulative oven top or cover 50. Cover 50, preferably, includes venting means in the form of an aperture 52 extending through cover 50. Upon enclosure of opening 48, cover 50 and housing 38 define the cooking interior 22 while centralized aperture 52 provides a vent means for venting of heat and smoke.

In the preferred form, as will be discussed below, the vertical interior side wall 28 of side body portion 44 form an upwardly standing cylinder which houses a plurality of removable rack holders 54 embedded in side wall 28. Preferably, a plurality of sets of rack holders 54 are provided at different elevations enabling placement of cooking racks 56 at each different elevation. The rack holders 54 are removable which facilitate cleaning. It will be appreciated that the cooking meats (not shown) are either placed on top of or hung from racks 56.

As can be seen in FIGS. 1 and 2, an annular or "doughnut" shaped trough 24 is positioned proximate the bottom floor 42. The trough 24 includes an inner perimeter flange 72 which defines a trough central opening 58. However, as will be explained below, a vertical space is provided between the trough 24 and the floor 42 to allow interior access to heating means 32 and 34 and smoke chip box 60 through trough opening 58. Trough 24 is formed to retain humidifying water 43, which provides a means for humidifying the cooking interior 22, and trough 24 collects grease and other cooking byproducts therein.

In the preferred embodiment, an outer trough perimeter 26 is sufficiently close to wall 28 to catch drippings deposited on the side wall. This can be achieved by having perimeter 26 be dimensioned to contact wall 28 and/or by having perimeter 26 extend into a recess 62 under a shoulder in side wall 28. If positioned under a side wall shoulder, perimeter 26 need not engage the side wall in order to catch drippings. All meat byproduct substances deposited on vertical side wall 28 therefore, will gravitate down toward and into water trough 24. Moreover, because side wall 28 is formed with a recess 62, as clearly illustrated in FIG. 2, the drippings cannot splatter against the sides of trough 24 and be deflected onto side wall 28, as can occur with prior art ovens. The present invention will still be effective even if the outer trough perimeter 26 is not fully recessed, but is instead flush with or engages the vertical interior side wall 28. It will be appreciated that in the preferred form, the outer trough perimeter 26 is to be integral with the sidewall 28. This may be accomplished, in some instances, by welding the outer trough perimeter 26 directly to the vertical sidewall 28 so as to form a unitary structure.

A conical umbrella-shaped dripping or grease deflector, generally designated 64, is centrally positioned, vertically, above the trough 24. Deflector 64 is preferably insulated so that heated air impinging upon the deflector bottom surface 82 (discussed below) does not cause the grease and byproduct drippings falling onto the deflector to carbonize or burn the drippings. As best illustrated in FIG. 2, deflector 64 is sloped downwardly at an angle sufficient to redirect all meat byproduct drippings into trough 24. Thus, all drippings which would otherwise fall into trough central opening 58 will be redirected into trough 24. Therefore, in the preferred form, the outermost deflector perimeter 66 must extend vertically over humidifying water 43 and, thus, trough 24. It will be appreciated that all byproduct dripping substances, either deposited on deflector 64 or interior wall 28, will be redirected into water trough 24.

As best viewed in FIG. 2, deflector 64 is supported above trough 24 by support rods 68 fixed to a base support ring 70. Support ring 70 includes a bottom facing annular recess lip 71, which is dimensioned to seat against the inner perimeter trough flange 72 such that deflector 64 is removably secured above opening 58. These components are better shown in FIG. 4, which illustrates the trough recess assembly of the present invention during cleaning. Thus, deflector 64 may removed from trough opening 58 to provide access to the heating means 32 and 34 or the chip box 60 (both discussed below).

An inlet means 30 provides humidifying water 43, as well as cleansing water 40, to trough 24 which humidifies the cooking interior 22. As best illustrated in FIG. 2, inlet 30 comprises a faucet nozzle preferably positioned above trough 24 which extends through interior wall 28. Humidifying water 43 may be sprayed or trickled into cooking interior 22 wherein it is redirected into trough 24, similar to the meat byproduct drippings. In the preferred form, trough 24 holds approximately three gallons of humidifying water 43. It is noted, however, that a larger or smaller quantity of water 43 may be retained in trough 24 without departing from the true spirit of the invention. Moreover, cooking without the use of humidifying water also can be undertaken, for example, when jerking meat.

A removable dispenser chip box 60, which contains the smoking chips 74, is provided centrally beneath trough opening 58 and, thus, deflector 64. Chip box 60 is fixed to a guided drawer 76 dimensioned to be received in a slot 78 defined by insulative housing 38. Therefore, to access box 60, drawer 76 is slid along guides (not shown) affixed inside slot 78.

As can be shown in FIG. 2, the chip box 60 is positioned above a first set of heating means 32 which preferably comprise electronic heating elements common in the field. The first heating elements 32 heat chip box 60 whereby smoke chips 74 are heated to a smoldering level. A bottom aperture 80 extends through the bottom floor 42 of housing 38 to provide a passage to allow unheated air therethrough. Bottom aperture 80 is strategically located below the first and second heating elements 32 and 34, respectively, such that the unheated air is drawn through aperture 80, heated and discharged into the cooking interior 22 through trough opening 58. As the heated air and smoke rise through trough opening 58, they impinge a bottom side 82 of deflector 64, which forces the smoke and heated air out over water trough 24. When the heated air and smoke contact the humidifying water 43 retained in trough 24, they absorb moisture, which humidifies the cooking interior 22 and bathes the meats in humidified smoke.

The second set of heating elements 34 is then activated to heat the interior 22 to a programmed temperature range between 140 degrees–210 degrees Fahrenheit. More moisture is picked up which facilitates reduction of meat shrinkage as well as providing more heat to kill germs which may spoil the product smoked.

Accordingly, cooking interior 22 is heated directly by first heating elements 32 which smolder the chips 74, and by second heating elements 34. Heating elements 32 and 34 are further, preferably, electronically coupled to a control panel 83, shown in FIGS. 1 and 2 and to a thermostat 45 strategically located within the cooking interior 22 for uniform control. Such components just described are broadly old in the art and do not themselves comprise a novel portion of the present invention.

As oven interior 22 is heated, the oils and juices within the meats begin to heat and liquify. According to the present invention, the drippings or meats byproduct substances fall vertically downward until they contact deflector 64 and run to the outer deflector perimeter 66. Once the dripping substances accumulate along the outer perimeter 66, they will gravitationally fall into the humidifying water 43 as opposed to the bottom floor.

Although the present invention substantially reduces oil accumulation and splattering, some drippings, nonetheless, will contact interior side wall 28. Thus, it is still sometimes necessary, although not as frequently, to clean the cooking interior 22, as well as the annular trough 24 itself.

In accordance with the present invention, cleaning the cooking interior 22 is substantially simplified and easily achieved with minimal effort. Top cover 50, and the cooking racks 56, are removed from cooking interior 22. The mixture of humidifying water 43 and byproduct substances is then drained from trough 24 by drainage means 36.

Briefly, drainage means 36 comprises a drain 84 flushly mounted to the bottom of trough 24 coupled to piping 86 which extends to the exterior of housing 38. Preferably coupled to the distal end of piping 86 is a drain valve 88, as viewed in FIG. 2 which enables filling and draining of trough 24.

Figure 4:
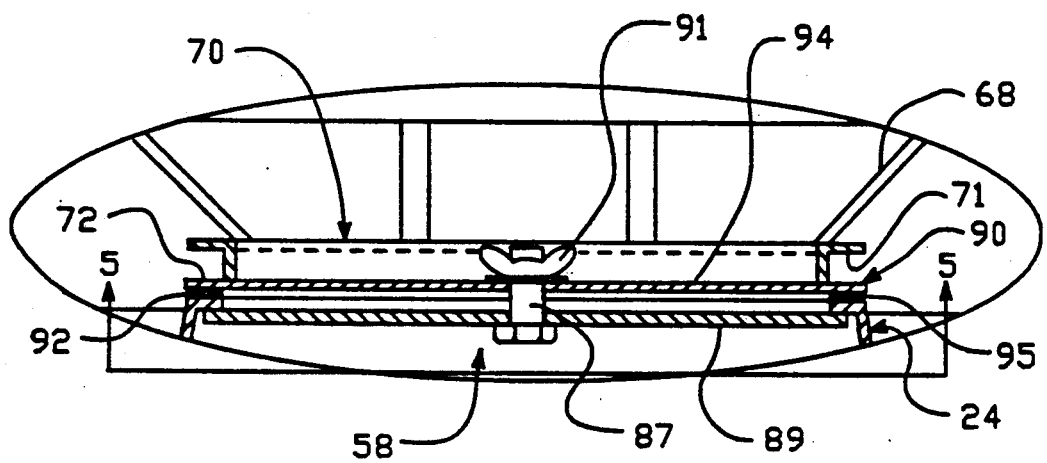
FIG. 4 is an enlarged, side elevation view, in cross-section, of the trough recess assembly of the present invention during cleaning, taken along the line bounded by 4—4 of FIG. 3.

It will be appreciated that, in some instances, the act of draining the water trough 24 may be sufficient enough to avoid a full interior 22 washing of the oven 20. Thus, it is not always necessary to clean the oven interior 22 after each use. However, when a full washing is necessary, the next procedure is to remove the deflector 64 from trough opening 58 and insert a plug 90, as shown in FIG. 4, over the opening 58. Plug 90 is essentially a circular plate which includes a bottom surface 92 dimensioned to abut the upper surface of the inner perimeter trough flange 72 to provide a watertight seal. This protects the first and second heating elements 32 and 34 from water. A rubber washer 95 may be provided between the bottom plug surface 92 and the inner perimeter trough flange 72 to promote sealing.

Figure 5:
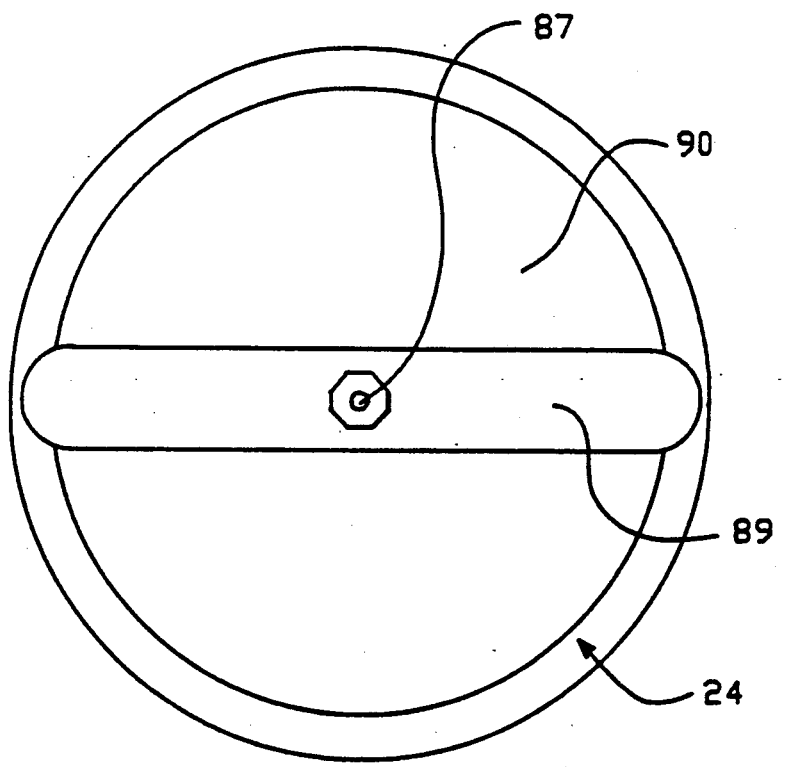
FIG. 5 is a bottom plan view taken substantially along the plane 5—5 of FIG. 4 of the trough recess.

As best viewed in FIGS. 4 and 5, recess plug 90 is mounted over trough opening 58 by coupling it to a mounting plate 89 which spans the diameter of trough opening 58 and abuts the bottom surface of the inner perimeter trough flange 72. A bolt 87 passes through corresponding apertures, respectively, defined by the mounting 89 and plug 90. A wing nut 91 securely locks the plug 90 over opening 58 which, in conjunction with the rubber washer 95, form a water-tight seal.

Subsequently, deflector 64 may be placed back over trough opening 58 as shown in FIG. 4, by placing deflector support base 70 on the top surface 94 of plug 90. The cooking racks 56 are then reinstalled, and drainage valve 88 is closed to prevent leakage from the interior 22.

Inlet means 30, which is used to fill trough 24 with humidifying water 43, sprays cooking interior 22 with cleansing water 40 until cooking interior 22 is partially submersed. Preferably, as shown in FIG. 3, cleansing water level 40 extends 4 inches-7 inches above trough 24. Detergent is added to aid substance removal; however, it is noted that it is not always necessary.

In accordance with the present invention, after top cover 50 is reinstalled, interior cleansing water 40 is heated to approximately 200 degrees fahrenheit by the first and second heating elements 32 and 34 to aid in loosening the baked-on debris. Merely adding hot water may also suffice in some situations. This allows the baked-on debris to be easily removed with minimal effort. Only a slight brushing is necessary to dislodge the debris as opposed to strenuous scrubbing, as needed in the previously discussed ovens. All dislodged debris and cleansing fluid 40, similarly, collects in trough 24.

Drainage valve 88 is then opened and cleansing water 40 is drained through drain 84 to drain cooking interior 22. Interior 22 may be sprayed once more for a final rinsing. As previously mentioned, the rinsing liquid will be redirected by side wall 28, and by deflector 64 into water trough 24, and ultimately drained through drainage means 36. Accordingly, the smoker oven according to the present invention provides a smoking apparatus which minimizes cleaning effort.

A top cover handle 97 and outer housing handles (not shown) may be strategically located to enable lifting of the top cover 50 and the housing 38, respectively. Moreover, hangers 98 may be provided on exterior shell 77 of housing 38 in order to hand or suspend cooking racks 56 or top cover 50 so that they do not touch the ground when not in use. Lastly, rollers or wheels 93 may be mounted to the bottom floor 42 to enable rolling movement.

In the preferred embodiment, housing 38 as well as top cover 50, deflector 64 and plug 90 are preferably composed of heat resistant stainless steel plating which sandwich an insulative material. It will be appreciated, however, that other heat resistant materials, such as ceramic, may be substituted for or used as coatings on some, if not all, of the components of oven 20.

Moreover, in accordance with the present invention, housing 38 of oven 20 is preferably 40 inches in height and 26 inches in outer shell diameter. Insulated side walls 28 are preferably 1 inch thick while the bottom floor is preferably 2 inches thick. Accordingly, the outer trough diameter, of the trough 24 (i.e. the outer trough perimeter 26), is approximately 24 inches in diameter. Additionally, in the preferred form, the inner trough diameter is approximately 10 inches in diameter, so that the annular trough 24 width is approximately 4 inches. Bottom floor aperture 80 is preferably ½ inch in diameter while ceiling aperture 52 is approximately 1¼ inches in diameter. It will be appreciated that the dimensions of the oven 20 set forth above may be changed without departing from the true scope and spirit of the present invention.

In an alternative cleaning embodiment of the present invention, a high pressurized spraying wand (not shown) may be inserted into cooking interior 22 through ceiling aperture 52. Therefore, the diameter of ceiling aperture 52 of top cover 50 must be large enough to accept the specially formed spraying wand therethrough. Thus, during cleaning of oven 20, the spraying wand is lowered through ceiling aperture 52 wherein the high pressure spray removes debris from interior side walls 28. This eliminates the need for brushing the walls 28 to effectuate cleaning.

In another alternative embodiment of the present invention, access to cooking interior 22 may be provided by a watertight side door (not shown) defined in the side of body portion 44 and extending through interior side wall 28, rather than access through the top opening 48. However, it will be noted that the interior surface of the side door must conform with interior side wall 28 so as not to obstruct run-off of the byproduct substances from side wall 28 into trough 24.

In still another alternate embodiment of the present invention, detergent may be injected into the cooking interior 22, during washing, through inlet means 30, or by providing a separate inlet (not shown) similarly situated in cooking interior 22.

In a further embodiment, to prevent flooding of the trough 24 during filling with humidifying water 43, a drain extension 96 may be inserted into drain 84, as clearly illustrated in FIG. 2. Extension 96 effectively raises the drainage level, vertically, to a predetermined position which will generally be just below the maximum water level retainable in the trough 24. Therefore, if the quantity of humidifying water 43 in the trough 24 is too great, the water 43 may be drained automatically from the water trough 24.

As is apparent from the discussion of the various embodiments of the oven assembly of the present invention, the method of cleaning cooking interior 22 of housing 44 may best be described by employing an oven assembly 20 of the present invention. The method is most preferably accomplished by spraying cleaning fluid into cooking interior 22 of the oven 20 which collects in trough 24. Oven interior 22 is then cleaned wherein the cleaning fluid 40 and other substances collect in the trough 24. Subsequently, cleaning fluid 40 and other substances are then removed from the cooking interior 22 by a drainage mechanism 36 situated at the bottom of the trough 24. Additionally, the method of the present invention may be accomplished by heating the cleaning fluid 40 to facilitate the cleansing effectiveness.

Furthermore, the step of cleaning the interior side walls 28 and trough 24 may be accomplished by either brushing walls 28 and trough 24 or by inserting a high pressured spraying wand 100 through the ceiling aperture 52 of the top 50. The spraying wand 100 includes spraying apertures 102 circumferentially distributed about the bottom portion of wand 100. A high pressure water stream is sprayed out of spraying apertures 102 which dislodge the debris and by-products, as previously described. In still another aspect, detergent may be added to cleansing fluid 40.

Therefore, and in accordance with the present invention, a new and improved smoker oven is provided which facilitates the cleaning of the smoker oven and further, substantially simplifies removal and refilling of the cooking water which is necessary to humidify the cooking area within smoker ovens.

While in the foregoing specification the present invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

Therefore, persons of ordinary skill in this field are to understand that all such equivalent structures are to be included within the scope of the following claims.

What is claimed is:

1. An oven including a housing having a top, a bottom wall and a side wall extending between said top and said bottom wall which defines an interior volume formed for receipt and cooking of food therein, and heating means positioned proximate said bottom wall, the improvement comprising:

an annular trough positioned in said housing proximate said bottom wall between said top and said heating means and opening into said interior volume for communication of water vapor to food positioned in said interior volume for cooking, said trough having an outer trough perimeter dimensioned to extend and directly contact an inner perimeter surface of said side wall to be positioned for receipt of gravitating substances deposited on said side wall directly into said trough, and said trough being formed to receive and collect said substances and to retain a quantity of a liquid sufficient for humidification of food cooked in said interior volume of said oven; and drainage means extending from said trough to an outside of said housing for removal of said substances and said liquid from said trough.

2. The oven as defined in claim 1 including, liquid inlet means mounted to said housing for filling said trough with said liquid.

3. The oven as defined in claim 1 wherein, said annular trough includes an inner trough perimeter which defines a central opening in a middle section thereof, said heating means being positioned below said trough and providing heated air through said central opening to said interior volume.

4. The oven as defined in claim 3 including, deflector means in centrally positioned above said central opening for deflecting said substances into said trough, and for deflecting said heated air passing through said opening over said trough and over said liquid to humidify the same.

5. The oven as defined in claim 4 wherein, said deflector means comprises a cone having its outwardly diverging surface facing upwardly.

6. The oven as defined in claim 1 wherein, said housing perimeter is circular and formed with a downward facing shoulder therein, said outer trough perimeter being positioned underneath said shoulder.

7. The oven as defined in claim 1 including, a slidable heating tray positioned below a central opening of said annular trough.

8. The oven as defined in claim 1 wherein, said housing is insulated.

9. The oven as defined in claim 1 including, valve means connected to said drainage means for controlling flow of liquid through said drainage means.

10. The oven as defined in claim 1 wherein, said top includes an aperture extending into said interior volume.

11. The oven as defined in claim 1 wherein, said bottom includes an aperture extending into said interior volume.

12. The oven as defined in claim 1 including, a plurality of cooking racks disposed in said interior volume.

13. The oven as defined in claim 1 wherein, the top of said housing includes an aperture dimensioned to receive a pressurized spraying wand.

14. An oven comprising:

a housing including a top, a bottom wall and a side wall extending between said top and said bottom wall which defines an interior volume, and a heating element positioned proximate the bottom wall;

an annular trough positioned in said housing proximate said bottom wall between said top and said heating element and having an outer trough perimeter dimensioned to extend and directly contact an inner perimeter surface of said side wall to catch cooking by-products gravitating down said side wall, said trough opening upwardly directly into a portion of said interior volume receiving food for cooking, and said trough having an inner trough perimeter defining a central opening, and said trough being formed to retain a quantity of a liquid sufficient for humidification of food cooked in said oven;

said heating element being positioned below said trough for the passage of heated air through said central opening to provide heat to said interior volume;

drainage means extending from said trough through a wall of said housing to outside of said housing for removing cooking by-products and said liquid from said trough; and deflector means centrally positioned above said central opening and deflecting heated air over said trough and over said liquid to humidify said interior volume.

15. The oven as defined in claim 14 including, liquid inlet means mounted to said housing for filling said trough with said liquid.

16. The oven as defined in claim 14 wherein, said deflector means is provided by a conical deflector having its apex upwardly facing.

17. The oven as defined in claim 14 wherein, said side wall is formed with a step therein including a downwardly facing shoulder extending around the perimeter of said side wall, said outer trough perimeter extending outwardly to a position beneath and radially outward of said shoulder.

18. The oven as defined in claim 14 wherein, said housing is insulated.

19. The oven as defined in claim 14 including, valve means connected to said drainage means for controlling flow of liquid through said drainage means.

20. The oven as defined in claim 14 wherein,
said top includes an aperture extending into said interior volume.
21. The oven as defined in claim 14 wherein,
said bottom includes an aperture extending into said interior volume.
22. The oven as defined in claim 14 including,
a plurality of cooking racks disposed in said interior volume.
23. The oven as defined in claim 14 including,
a slidable heating tray positioned below said central opening.
24. The oven as defined in claim 14 wherein,
the top of said housing includes an aperture dimensioned to receive a pressurized spraying wand.

* * * * *